Sept. 27, 1966  J. H. WOOD  3,275,286
FLOW CONTROL VALVE

Filed Oct. 8, 1962  3 Sheets-Sheet 1

INVENTOR.
JAMES H. WOOD
BY
George C. Sullivan
Agent

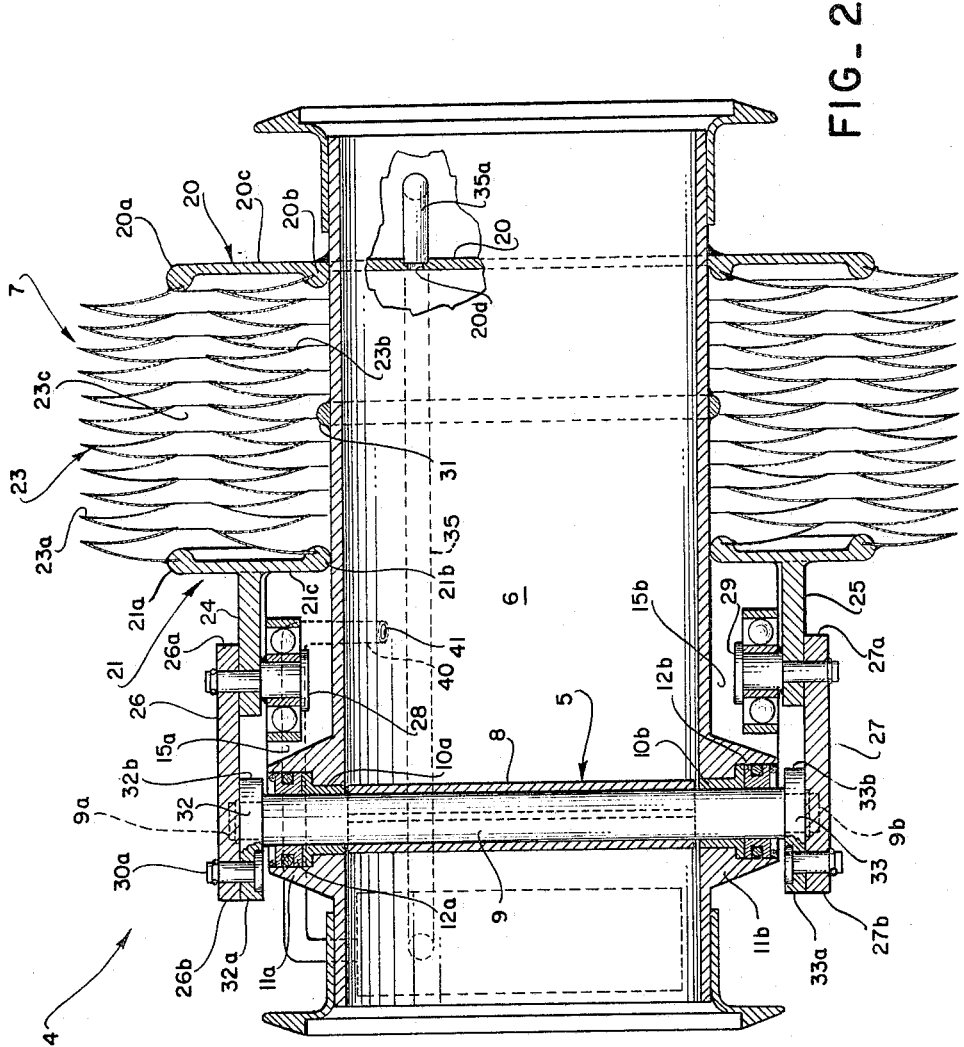

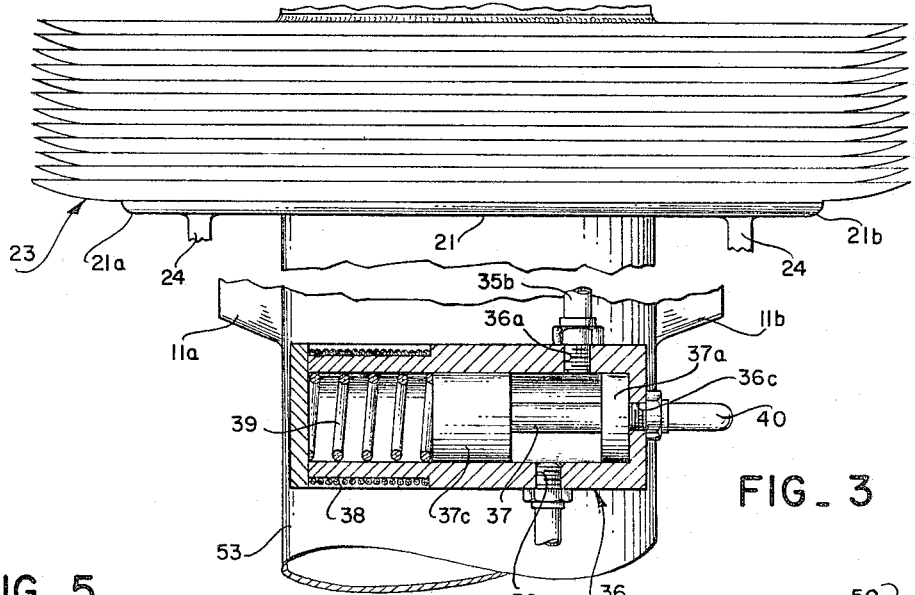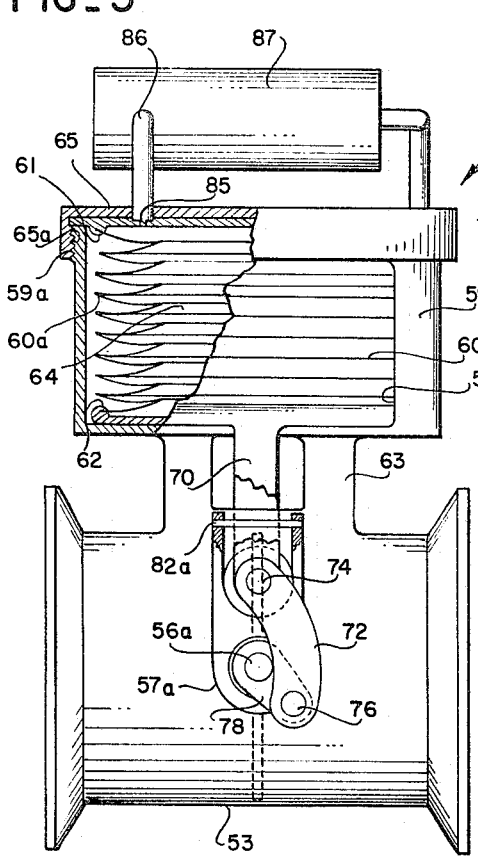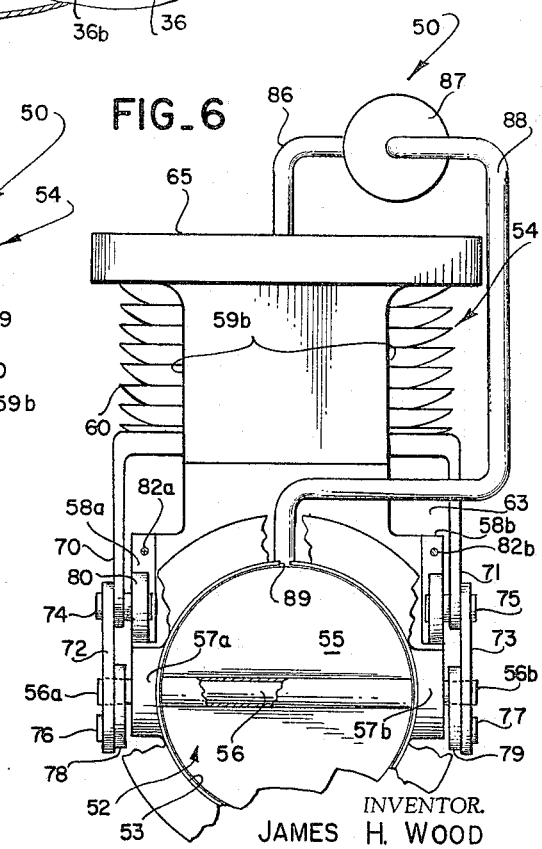

United States Patent Office 3,275,286
Patented Sept. 27, 1966

3,275,286
FLOW CONTROL VALVE
James H. Wood, Marietta, Ga., assignor to Lockheed Aircraft Corporation, Burbank, Calif.
Filed Oct. 8, 1962, Ser. No. 228,917
10 Claims. (Cl. 251—30)

This invention relates to a fluid system flow control valve assembly and more particularly to a simple, reliable, and compact fluid system flow control valve assembly wherein fluid pressure in the system is utilized as a motive force for actuating the valve.

In the aircraft industry where the fluid flow control valve assembly of this invention finds particular utility, there are stringent requirements for compactness and simplicity to assure maximum reliability. These requirements are met by this invention in that the control valve is made up of few parts which are uniquely arranged in a minimum of space. The actuator for the control valve is of the bellows type and uses the fluid flowing through the duct in which the control valve is mounted for positioning the control valve is at least one direction. Thus, the control valve actuator is economical of operation and has a constant and ready supply of power fluid when needed. Although the flow control valve is specifically designed for actuation by the fluid flowing through the duct in which it is mounted, it is to be understood that it is readily adapted for use with an independent source of fluid pressure supply. The bellows is of metallic construction and gives the flow control valve the capability of being operative over high temperature and pressure ranges. Moreover, the metallic bellows has a much shorter length and stroke than comparable nonmetallic bellows and its use permits shortening of the overall length of the flow control valve. An important consideration in the design of any control valve is that of reducing to a minimum the force moments in the valve actuator linkage which would cause excessive and uneven wearing of the valve bearings. To this end the flow control valve is actuated by applying equal forces to the opposite ends of its pivot pin and structure is provided for guiding the bellows during expansion and contraction. The actuating linkage is further uniquely designed to permit a short valve operating stroke, thus reducing the space occupied by the flow control valve assembly. To permit remote control of the flow control valve, there is provided a solenoid operated valve connecting the interior of the bellows actuator of the control valve with a source of fluid supply and with exhaust. Also, positive stops of simple construction are provided for controlling the amount of opening and closing of the control valve.

Accordingly, it is an object of this invention to provide a fluid system flow control valve which is compact and of simple construction, hence reliable in operation.

Another object of this invention is to provide a flow control valve for a duct wherein the motive force for actuating the valve in at least one direction is supplied by the pressure of the fluid in the duct.

Another object of this invention is to provide a bellows actuated flow control valve wherein the limits of expansion and contraction of the bellows actuator are defined by positive stops.

Other objects and advantages will become apparent from the following description taken in connection with the accompanying drawings in which:

FIGURE 2 is a sectional side view taken along lines 2—2 of FIGURE 1;

FIGURE 3 is a top plan view partially in section of the control valve of FIGURE 1;

FIGURE 5 is a partially sectional side view of another embodiment of a flow control valve of this invention; and FIGURE 6 is an end view partially in section of the flow control valve of FIGURE 5.

Generally stated, this invention relates to a fluid system flow control valve assembly which is of simple construction, reliable, and compact wherein opening and closing of the valve element is effected by expansion and contraction of a bellows valve actuator. A constant power supply for the valve operator is assured under conditions when there is a need for operation of the valve, since the valve actuator is operated by fluid pressure in the duct in which the valve element is mounted. Also, there are provided positive stops for defining the limits of extension and contraction of the bellows to thereby define the limits of movement of the butterfly control valve. For eliminating moment forces from causing excessive and uneven wearing of the bearings in which the butterfly valve is mounted, provisions are made for actuating the butterfly valve from both ends and for preventing twisting of the bellows valve actuator.

Figure 1:
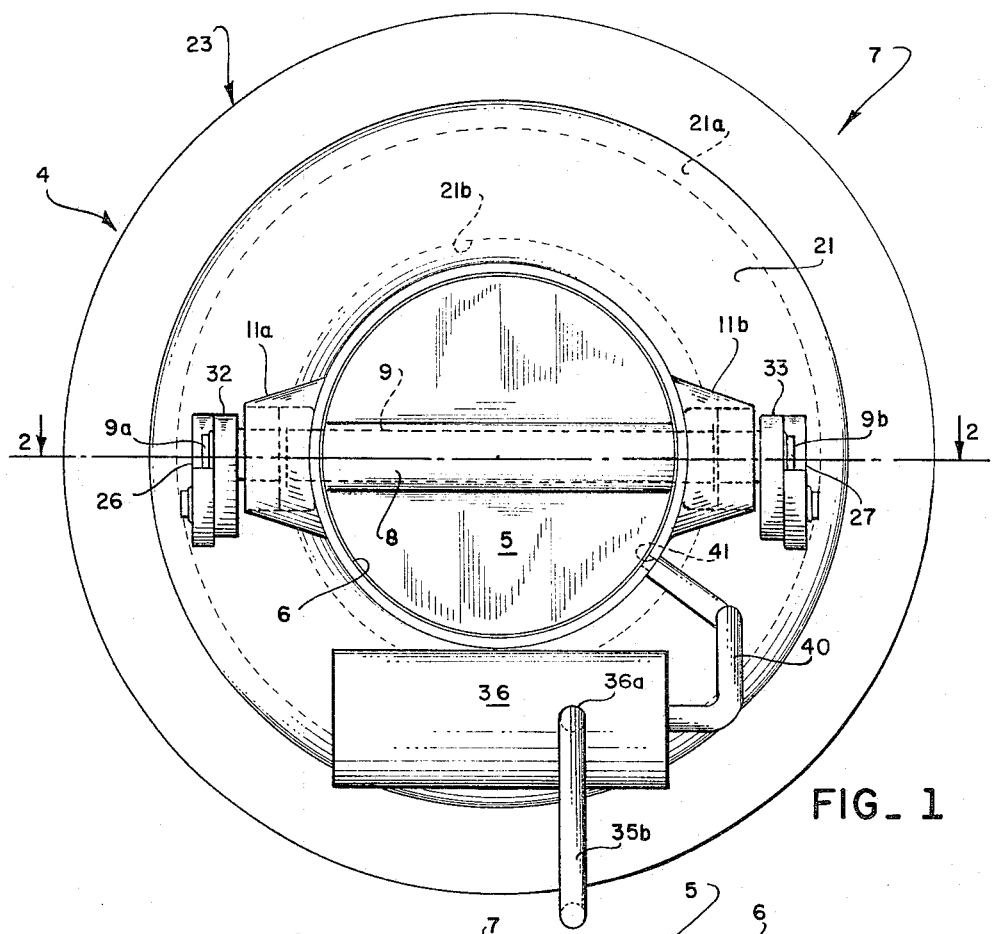
FIGURE 1 is an end view of a duct provided with one embodiment of a flow control valve of this invention.
Figure 4:
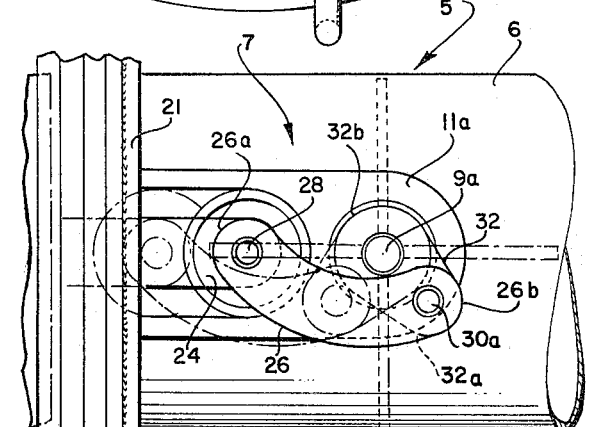
FIGURE 4 is an enlarged view of the actuating linkage for the flow control valve of FIGURE 1.

Referring now to FIGURES 1 to 3 of the drawings there is shown a fluid system flow control valve or shut-off valve assembly 4 comprising a butterfly valve assembly 5 for controlling fluid flow through the valve housing or duct 6 and a bellows valve actuator assembly 7 for opening and closing the butterfly valve assembly 5. The butterfly valve assembly 5 comprises a circular duct closure member or valve element 8 fixedly mounted on a pivot pin 9. The pivot pin 9 is mounted on a diametral line through the duct 6 with its opposite terminal ends 9a and 9b protruding from the duct and rotatably mounted in elongate bearing sleeves 10a and 10b, which are mounted in bored and counterbored bosses 11a and 11b, respectively. Bosses 11a and 11b are preferably cast integrally with the duct 6 and the bearing sleeves 10a and 10b are of softer metal than the pivot pin 9 to prevent scoring of the pivot pin. To prevent leakage from the duct around the pivot pin ends, there are provided in the counterbores of each of bosses 11a and 11b preferably Teflon sealing washers 12a and 12b having peripheral grooves fitted with O-rings and held in place by snap rings. Adjacent the bosses 11a and 11b, in alignment with the longitudinal axis of the duct 6, there are provided guide slots 15a and 15b for a purpose which will more clearly appear. For actuating the butterfly valve assembly 5 above described, there is provided the bellows valve actuator assembly 7 now to be described in detail.

Bellows valve actuator assembly 7 comprises an annular bellows 23, the opposite ends of which are closed by two spaced apart annular plate members 20 and 21 which are mounted in surrounding relation to duct 6. The annular plate 20 is preferably cast so as to form annular lips 20a and 20b in upstanding relation with respect to base portion 20c, and the annular plate 21 is cast in a like manner with annular lips 21a and 21b formed in upstanding relation with respect to the base portion 21c.

Annular bellows 23 has an outer self-retracting annular wall 23a the opposite ends of which are secured in fluid-tight relation in slots formed in the aligned confronting lips 20a and 21a, respectively, of annular plates 20 and 21. Bellows 23 also has an inner self-retracting annular wall 23b, the opposite ends of which are secured in fluid-tight relation in slots formed in the lips 20b and 21b, respectively, of annular plates 20 and 21 to form the bellows chamber 23c. The bellows walls 23a and 23b have matched spring rates and are preferably each formed by interconnecting a plurality of resilient circular metallic plates at their peripheries and proximate their axes in accordion-fashion by welding. Annular plate 20 is fixedly secured with respect to duct 6 by welding base portion 20c thereto, and annular plate 21 is free to move or slide longitudinally with respect to duct 6. Consequently, the annular plate 21 is guidably positioned along the length of duct 6 in response to expansion and contraction of the bellows 23 to thereby actuate the butterfly valve assembly 5 and is operative to actuate the butterfly valve assembly 5 through an interconnecting linkage now to be described in detail.

Two diametrically oppositely related actuating arms 24 and 25 are cantilever secured to the base 21c of plate 21 in alignment with the longitudinal axis of the bellows 23 and the duct 6 such that their central axis perpendicularly intersects the axis of pivot pin 9 at opposite ends thereof. Actuating arms 24 and 25 are pivotally secured at their free ends to the ends 26a and 27a of arcuate crank arms 26 and 27, respectively, by pivot pins 28 and 29. The other ends 26b and 27b of arcuate crank arms 26 and 27 are pivotally connected to pivot posts 30a and 30b on the ends 32a and 33a, respectively, of lever arms 32 and 33. In turn, the other ends 32b and 33b of the lever arms 32 and 33 are fixedly connected to the opposite terminal ends 9a and 9b of pivot pin 9.

It will be seen therefore that upon movement of actuating arms 24 and 25 along the longitudinal axis of duct 6, the crank arms 26 and 27 pivot about their ends 26a and 27a such that their other ends 26b and 27b move arcuately about the axis of rotation of pivot pin 9 and in so doing impart rotary motion to the pivot pin 9 and the butterfly valve element 8 through the intermediary of lever arms 32 and 33. It should be particularly noted that the actuating linkage above described permits full 90-degree rotation of valve assembly 5 between fully open and fully closed positions in response to a very short stroke of the actuating arms, thus permitting the use of short actuating arms and a corresponding reduction in the length of the flow control valve.

For controlling the amount of opening and closing of the valve assembly 5, the lip 21b of annular plate 21 abuts an annular ring weld 31 formed on the exterior surface of duct 6, as when the butterfly valve is open, for example; and the base 21c of the annular plate 21 abuts the end of the bosses in which the guide slots 15a and 15b are formed to define the other limit of movement of the annular plate 21, as when the butterfly valve is rotated 90 degrees from its open position, for example. The actuating linkage just described transfers equal actuating forces from the actuating arms 24 and 25 to the opposite ends of pivot pin 9 so as to eliminate twisting moments causing excessive and uneven wearing of the bearing sleeves 10a and 10b, and to prevent binding of the pivot pin in the bearing sleeves. Additionally, cam or guide structure is provided for preventing the bellows 23 from twisting. Although the guide structure may take various forms, the pivot pins 28 and 29 are preferably provided with bearing assemblies and are mounted for guided movement within the guide slots 15a and 15b.

For connecting the bellows chamber 23c to fluid pressure supply and to exhaust, an orifice opening 20d is formed in the base 20c of annular plate 20 and one end 35a of supply and exhaust tube 35 is connected to the orifice opening. At its other end 35b, the tube 35 is connected to the port 36a of solenoid operated valve 36, shown in detail in FIGURE 3. Valve 36 includes a spool valve element 37 having a fluid divider 37a and an iron core portion 37c disposed operatively adjacent solenoid coil 38. When the solenoid coil 38 is de-energized, coil spring 39 positions spool valve element 37, shown in FIGURE 3, to communicate the port 36a with the atmosphere through orifice opening 36b; and when the solenoid coil 38 is energized, the spool valve element 37 is positioned to communicate port 36a through port 36c, tube 40, and orifice opening 41 with the interior of duct 6.

In operation, when the solenoid valve 36 is de-energized, the bellows chamber 23c will be in communication with the atmosphere through orifice opening 20d, tube 35, valve port 36a, and valve orifice opening 36b; the bellows assembly 23 is retracted as shown in FIGURE 3; and butterfly valve element 8 will be open. Upon actuation of the solenoid valve 36, fluid pressure in duct 6 is delivered into the interior of chamber 23c through orifice opening 41, tube 40, valve ports 36c and 36a, tube 35, and orifice opening 20d. As the pressure in the duct 6 increases, the pressure in the chamber 23c increases a corresponding amount and as a consequence the bellows 23 expands to move the annular ring 21 to the left as seen in FIGURE 1 until its movement is stopped by contact with the bosses in which the guide slots 15a and 15b are formed. Concomitantly, the actuating arms 24 and 25 operate to rotate pivot pin 9 through an angle of 90 degrees through the intermediary of crank arms 26, 27 and lever arms 32, 33. To close the butterfly valve assembly 5, the solenoid valve is de-energized, thereby placing chamber 23c in fluid communication with ambient air through port 20d, tube 35, valve port 36a, and orifice opening 36b, thus permitting the spring rate of bellows 23 to retract the flange 21a of annular ring 21 into abutment with ring weld 31 to drive the butterfly valve assembly 5 to the closed position.

Referring now to FIGURES 5 and 6 therein shown is a fluid system flow control valve assembly 50 which is another embodiment of this invention. Control valve assembly 50 comprises a butterfly valve assembly 52 for controlling fluid flow through the duct or valve housing 53 and a bellows valve actuator assembly 54 for opening and closing the butterfly valve assembly 52.

The butterfly valve assembly 52 comprises a cast circular duct closure or valve element 55 mounted on a pivot pin 56. The pivot pin 56 is mounted on a diametral line through the duct 53 with its opposite terminal ends 56a and 56b protruding from the duct and rotatably mounted in shaft seals and bearing sleeves in bosses 57a and 57b, respectively, in a manner identical to that discussed with respect to the control valve of FIGURES 1 to 4. Adjacent the bosses 57a and 57b, respectively, in alignment with an axis normal to the longitudinal axis of duct 53 are guide slots 58a and 58b. For actuating the butterfly valve assembly 52, there is provided the bellows valve actuator assembly 54 which will now be described in detail.

Bellows valve actuator assembly 54 comprises a tubular support housing 59 mounted as by screws on support posts 63 extending perpendicularly from the duct 53. The top end of housing 59 is open and is externally threaded at 59a and openings 59b are formed in opposite sides of housing 59 to facilitate the flow of ambient air relative to the bellows 60 which is mounted in the housing. Bellows 60 comprises a single annular bellows wall formed in the same manner as the bellows walls described in connection with the flow control valve of FIGURE 1 which is connected between plate member 61 and plate member 62 to form the bellows chamber 64 in the same manner as disclosed with respect to the flow control valve of FIGURES 1 to 4. Plate 61 is held fixedly in place on the top of housing 59 by the interengagement of the internal screw threads 65a of housing cap 65 with the external screw threads 59a of the housing 59, and the plate 62 is free to move. Consequently, upon expansion and contraction of the bellows 60, the plate 62 will be positioned relative to the pivot pin 56 to actuate the butterfly valve assembly through an actuating linkage now to be described.

Two diametrically oppositely related actuating arms 70 and 71 are cantilever secured to the base of annular plate 62 and are disposed such that they protrude through the holes 59b of housing 59 with their central axis in alignment with an axis normal to the longitudinal axis of the duct 53 and perpendicularly intersecting the axis of pivot pin 56. Actuating arms 70 and 71 are pivotally secured to one end of arcuate crank arms 72 and 73, respectively, by pivot pins 74 and 75 and the other ends of crank arms 72 and 73 are pivotally connected by pivot posts 76 and 77 to the ends of lever arms 78 and 79. The dual actuating arms 70 and 71 and dual actuating linkages are provided for the purpose of preventing excessive and uneven wearing of the bearing sleeves in bosses 57a and 57b and to prevent binding of the pivot pin in the bearing sleeves. Additionally, cam or guide structure in the form of pivot pins 74 and 75 provided with bearing assemblies and mounted for guided movement within the guide slots 58a and 58b are provided for preventing the bellows from twisting.

It is to be understood that the actuating linkage just described is identical to the actuating linkage described in connection with the flow control valve of FIGURES 1 to 4 with the exception of the orientation of the component parts thereof and attention is directed to the actuating linkage of FIGURES 1 to 4 for the specific constructional details of the actuating linkage just described.

For controlling the amount of opening and closing of the valve assembly 52, the pivot pins 74 and 75 abut the stop pins 82a and 82b mounted through the sidewalls of guide slots 58a and 58b, respectively, as when the butterfly valve assembly is open, for example, and the pivot pins 74 and 75 abut the closed ends of the guide slots to define the other limit of movement of the butterfly valve assembly 52, as when it is closed, for example. To connect bellows chamber 64 with fluid pressure and to exhaust, there is provided an orifice opening 85 formed through cap 65 and plate 61. Additionally, supply and exhaust tube 86 connects the bellows chamber 64 through solenoid valve 87, of the same type as disclosed in connection with the flow control valve of FIGURES 1 to 4, to atmosphere, when the valve 87 is de-energized and control valve assembly 52 is closed, and to the interior of duct 53 when the valve 87 is energized and when the control valve assembly 52 is open through line 88 and orifice opening 89.

In operation, the bellows assembly 54 is operative upon expansion in response to fluid pressure in duct 53 to drive the valve assembly in one direction, and in the absence of such pressure the spring rate of the bellows 60 is operative to drive the valve assembly in the other direction in the same manner as described in connection with the flow control valve of FIGURES 1 to 4.

It will be appreciated from the above description of the flow control valves of this invention that they are uniquely constructed to take advantage of the available power in the duct through which flow is controlled, utilize simple operating mechanisms, and contain structure for eliminating twisting of the operating mechanisms. Thus, the flow control valves are economical, simple in construction, relatively compact, reliable; and as a consequence, have a long life expectancy.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. In combination: a duct; a valve element mounted in said duct for closing said duct; an annular bellows mounted in surrounding guided relation on said duct and having one end fixed with respect to said duct and the other end movable with respect thereto; actuating linkage directly connecting the movable end of said bellows to said valve element; and a fluid line means with control means therein connecting the interior of said bellows with the interior of said duct immediately upstream of said valve element and to exhaust for expanding and contracting said bellows to actuate said valve element between open and closed positions.

2. In combination: a duct; aligned bored bosses formed on opposite sides of said duct; a pivot pin mounted through said duct with its opposite ends pivotally mounted in said bored bosses and protruding therefrom; a butterfly valve closure element mounted in said duct on said pivot pin; a lever arm cantilever connected to each of said opposite terminal ends of said pivot pin; a pair of crank arms each pivotally connected at one end to the free end of each of said lever arms; a longitudinally expansible and contractible bellows having its one end closed by a first plate member fixedly mounted with respect to said duct and its other end closed by a second plate member freely movable with respect to said duct; and a fluid line means with control means therein connecting said bellows to a source of fluid supply and to exhaust for expanding and contracting said bellows and moving said second plate member in the direction of the longitudinal axis of the bellows, said second plate member being connected to the other end of each of said crank arms whereby said bellows is operative upon expansion and contraction to effect movement of said butterfly closure element between open and closed positions through the intermediary of said crank arms and said lever arms.

3. In combination: a duct; a pivot pin mounted through said duct with its opposite ends protruding from said duct; a butterfly valve closure element mounted in said duct on said pivot pin; a lever arm cantilever connected to each of said opposite terminal ends of said pivot pin; a pair of crank arms each having one end pivotally connected to the free end of each of said lever arms; a first plate member fixedly mounted with respect to said duct; a second plate member freely movable with respect to said duct; at least one bellows wall connected at its opposite ends to said first and second plate members to form a bellows chamber between said plate members; a fluid line means with control means therein connecting said bellows chamber to a source of fluid supply and to exhaust for expanding and contracting said bellows wall and moving said second plate member in the direction of the longitudinal axis of the bellows; and actuating arms cantilever mounted on said second plate member, each of said actuating arms pivotally connected at its free end to the other end of each of said crank arms and being operative upon expansion and contraction of said bellows wall to effect movement of said butterfly closure element between open and closed positions through the intermediary of said crank arms and said lever arms.

4. In combination: a duct; aligned bosses formed on opposite sides of said duct; a bore through each of said bosses; a bearing mounted in each of said bores; a pivot pin mounted through said duct with its opposite ends received in said bearings and protruding from said bosses; a butterfly valve closure element mounted in said duct on said pivot pin; a lever arm cantilever connected to each of said opposite terminal ends of said pivot pin; a pair of crank arms each having one end pivotally connected to the free end of each of said lever arms; a first plate member fixedly mounted with respect to said duct; a second plate member freely movable with respect to said duct; at least one bellows wall connected between said first and second plate members to form a bellows chamber; a fluid line means with control means therein connecting said bellows chamber to a source of fluid supply and to exhaust for expanding and contracting said bellows and moving said second plate member in the direction of the longitudinal axis of the bellows; and actuating arms cantilever mounted on said second plate member, said actuating arms pivotally connected at their free ends to the other end of each of said crank arms and operative upon expansion and contraction of said bellows to effect movement of said butterfly closure element between open and closed positions through the intermediary of said crank arms and said lever arms.

5. In combination: a duct; aligned bosses formed on opposite sides of said duct; a guide on said duct adjacent each of said bosses; a bore through said bosses; a bearing mounted in each of said bores; a pivot pin mounted through said duct with its opposite ends received in said bearings and protruding from said bosses; a butterfly valve closure element mounted in said duct on said pivot pin; a lever arm cantilever connected to each of said opposite terminal ends of said pivot pin; a pair of crank arms each pivotally connected at one end to the free end of each of said lever arms; a first plate member fixedly mounted with respect to said duct; a second plate member freely movable with respect to said duct; at least one bellows wall connected between said first and second plate members to form a bellows chamber; a fluid line means will control means therein connecting said bellows chamber to a source of fluid supply and to exhaust for expanding and contracting said bellows and reciprocatingly actuating said second plate member in the direction of the longitudinal axis of the bellows; a pair of actuating arms cantilever mounted on said second plate member; and guide structure secured to each of said actuating arms and guidably engaged with said guides on said duct for preventing twisting of said actuating arms, said actuating arms pivotally connected at their free ends to the other end of each of said crank arms and operative upon expansion and contraction of said bellows to effect movement of said butterfly closure element between open and closed position through the intermediary of said crank arms and said lever arms.

6. In combination: a duct; aligned bored bosses formed on opposite sides of said duct; a guide slot on said duct adjacent each of said bosses and having its central axis perpendicularly intersecting the axis of said bores; a pivot pin mounted through said duct with its opposite ends received in said bosses and protruding therefrom; a butterfly valve closure element mounted in said duct on said pivot pin; a lever arm cantilever connected to each of said opposite terminal ends of said pivot pin; a pair of arcuate crank arms each having one end pivotally connected to the free end of each of said lever arms, a first plate member fixedly mounted with respect to said duct; a second plate member freely movable with respect to said duct; at least one bellows wall connected between said first and second plate members to form a bellows chamber; a fluid line means with control means therein connecting said bellows chamber to a source of fluid supply and to exhaust for expanding and contracting said bellows and moving said second plate member in the direction of the longitudinal axis of the bellows; a pair of actuating arms cantilever mounted on said second plate member; and a guide structure secured to each of said actuating arms and guidably received in said guide slots, said actuating arms pivotally connected at their free ends to the other end of each of said crank arms and operative upon expansion and contraction of said bellows to effect movement of said butterfly closure element between open and closed position through the intermediary of said crank arms and said lever arms.

7. In combination: a duct; a valve element mounted in said duct for closing said duct; an annular longitudinally expansible and contractible bellows mounted in surrounding relation on said duct having one end fixed with respect to said duct and the other end movable with respect thereto; at least one actuating arm connected to said movable end of the bellows; actuating linkage operatively interconnecting said actuating arm and said valve element; and means connecting the interior of said bellows with a source of fluid supply and to exhaust for expanding and contracting said bellows to actuate said valve element between open and closed positions.

8. In combination: a duct; a pivot pin mounted through said duct with its opposite ends projecting therefrom; a valve element mounted in said duct on said pivot pin; a bellows having a first end fixedly mounted with respect to said duct and a second end movable relative to said duct, actuating linkage means directly interconnecting said opposite ends of said pivot pin to said second bellows end; and means for expanding and contracting said bellows for pivotal actuation of said valve element.

9. In combination: a duct; a pivot pin mounted through said duct with its opposite ends projecting therefrom; a valve element mounted in said duct on said pivot pin; a lever arm cantilever connected to each of said opposite terminal ends of said pivot pin; a pair of crank arms each having one end pivotally connected to the free end of each of said lever arms; a bellows having a first end fixed with respect to said duct and a second end freely movable with respect to said duct, the other ends of said crank arms fixedly connected to said second bellows end; and means for expanding and contracting said bellows.

10. The combination of claim 9 wherein guide tracks are provided on said duct, and each of said actuating arms is provided with guide structure in cooperating engagement with said guide tracks to prevent twisting of said bellows.

References Cited by the Examiner

UNITED STATES PATENTS

| 1,425,412 | 8/1922 | Norwood | 251—58 X |
| 1,967,981 | 7/1934 | Thomas | 251—58 X |
| 2,213,785 | 9/1940 | Larson et al. | 251—61.1 |
| 2,223,691 | 12/1940 | Lockwood | 137—796 |
| 2,523,013 | 9/1950 | Golden | 74—105 |
| 2,593,848 | 4/1952 | Clausen | 251—61.1 |
| 2,643,644 | 6/1953 | Way | 251—61.1 X |
| 2,770,251 | 11/1956 | Goddard | 251—61.1 X |
| 3,107,892 | 10/1963 | Ellis | 251—58 X |

FOREIGN PATENTS 568,730    7/1958    Belgium.

WILLIAM F. O'DEA, *Primary Examiner.*

MARTIN P. SCHWADRON, ISADOR WEIL,
*Examiners.*

R. MASSENGILL, D. LAMBERT, *Assistant Examiners.*